(12) United States Patent
Wu et al.

(10) Patent No.: US 8,470,446 B2
(45) Date of Patent: Jun. 25, 2013

(54) SILANE ACRYLATE CONTAINING INTERMEDIATE TRANSFER MEMBERS

(75) Inventors: Jin Wu, Pittsford, NY (US); Yuhua Tong, Webster, NY (US); Brian P Gilmartin, Williamsville, NY (US); Jonathan H Herko, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 517 days.

(21) Appl. No.: 12/749,548

(22) Filed: Mar. 30, 2010

(65) Prior Publication Data

US 2011/0244203 A1 Oct. 6, 2011

(51) Int. Cl.
*C08F 2/48* (2006.01)
*B32B 9/04* (2006.01)

(52) U.S. Cl.
USPC ........... 428/447; 428/421; 428/215; 428/339; 977/742; 399/308

(58) Field of Classification Search
None
See application file for complete search history.

(56) References Cited

U.S. PATENT DOCUMENTS

| | | | |
|---|---|---|---|
| 5,487,707 A | 1/1996 | Sharf et al. | |
| 6,139,784 A | 10/2000 | Oshima et al. | |
| 6,318,223 B1 | 11/2001 | Yu et al. | |
| 6,397,034 B1 | 5/2002 | Tarnawskyj et al. | |
| 6,440,515 B1 | 8/2002 | Thornton et al. | |
| 6,602,156 B2 | 8/2003 | Schlueter, Jr. | |
| 6,993,270 B2* | 1/2006 | Yoshioka et al. | 399/162 |
| 7,031,647 B2 | 4/2006 | Mishra et al. | |
| 7,130,569 B2 | 10/2006 | Goodman et al. | |
| 7,139,519 B2 | 11/2006 | Darcy, III et al. | |
| 2003/0087175 A1* | 5/2003 | Simpson et al. | 430/126 |
| 2005/0222332 A1* | 10/2005 | Nakagawa et al. | 525/104 |
| 2007/0026203 A1* | 2/2007 | Yamano et al. | 428/195.1 |
| 2007/0155851 A1* | 7/2007 | Alli et al. | 523/106 |
| 2008/0152895 A1* | 6/2008 | Law | 428/323 |
| 2009/0297232 A1 | 12/2009 | Wu | |
| 2010/0055463 A1 | 3/2010 | Wu | |
| 2010/0245511 A1* | 9/2010 | Ageishi | 347/102 |

OTHER PUBLICATIONS

"Synthesis of Organic-Inorganic Hybrid Material for Flexible Optical Waveguide Application", Ju Hyun Oh et al., Polymer Preprints 2009, 50(1), 499, Proceedings Published by the American Chemical Society (2009).*
Noncovalent Engineering of Carbon Nanotube Surfaces by Rigid, Functional Conjugated Polymers, Jian Chen et al. (J. Am. Chem. Soc. (JACS Communications), 124, 9034-9035 (2002).*
CAS Registry No. 74730-98-5 retrieved from https://scifinder.cas.org/scifinder/view/scifinder/scifinderExplore.jsf (Jul. 2012).*
Jin Wu et al., U.S. Application No. Not Yet Assigned on Fluoropolyimide Single Layered Intermediate Transfer Members, Filed Mar. 30, 2010.
Jin Wu et al., U.S. Application No. Not Yet Assigned on Fluoropolyimide Intermediate Transfer Members, Filed Mar. 30, 2010.
Jin Wu, U.S. Application No. Not Yet Assigned on Cyclo Olefin Polymer Containing Intermediate Transfer Members, Filed Mar. 30, 2010.
Jin Wu, U.S. Appl. No. 12/550,589 on Carbon Black Polymeric Intermediate Transfer Members, filed Aug. 31, 2009.
Jin Wu, U.S. Appl. No. 12/413,645 on Layered Intermediate Transfer Members, filed Mar. 30, 2009.
Jin Wu, U.S. Appl. No. 12/413,633 on Fluorinated Sulfonic Acid Polymer Grafted Polyaniline Containing Intermediate Transfer Members, filed Mar. 30, 2009.
Jin Wu, U.S. Appl. No. 12/413,638 on Perfluoropolyether Polymer Grafted Polyaniline Containing Intermediate Transfer Members, filed Mar. 30, 2009.
Jin Wu, U.S. Appl. No. 12/413,642 on Fluorotelomer Grafted Polyaniline Containing Intermediate Transfer Members, filed Mar. 30, 2009.
Jin Wu, U.S. Appl. No. 12/413,651 on Polyimide Polysiloxane Intermediate Transfer Members, filed Mar. 30, 2009.
Jin Wu et al., U.S. Appl. No. 12/550,594 on Carbon Nanotube Containing Intermediate Transfer Members, filed Aug. 31, 2009.
Geoffrey M.T. Foley et al., U.S. Appl. No. 12/624,589 on UV Cured Heterogeneous Intermediate Transfer Belts [ITB], filed Nov. 24, 2009.

* cited by examiner

*Primary Examiner* — Callie Shosho
*Assistant Examiner* — Kenneth Stachel
(74) *Attorney, Agent, or Firm* — Eugene O. Palazzo

(57) ABSTRACT

A UV curable intermediate transfer media, such as a belt, that includes a first supporting substrate, such as a polyimide substrate layer, and a second surface layer of a mixture of a carbon nanotube component, a photoinitiator component, and an organic inorganic hybrid component.

5 Claims, No Drawings

SILANE ACRYLATE CONTAINING INTERMEDIATE TRANSFER MEMBERS

CROSS REFERENCE TO RELATED APPLICATIONS

Copending U.S. application Ser. No. 12/749,539 filed concurrently herewith, entitled Fluoropolyimide Single Layered Intermediate Transfer Members, the disclosure of which is totally incorporated herein by reference, illustrates an intermediate transfer member comprised of a fluoropolyimide.

Copending U.S. application Ser. No. 12/749,545 filed concurrently herewith, entitled Fluoropolyimide Intermediate Transfer Members, the disclosure of which is totally incorporated herein by reference, illustrates an intermediate transfer member comprised of a polyimide substrate, and thereover a fluoropolyimide.

Copending U.S. application Ser. No. 12/749,547 filed concurrently herewith, entitled Cyclo Olefin Polymer Containing Intermediate Transfer Members, illustrates an intermediate transfer member comprised of an intermediate transfer member comprised of a cyclo olefin polymer.

Copending U.S. application Ser. No. 12/550,589, filed Aug. 31, 2009 on Carbon Black Polymeric Intermediate Transfer Members, illustrates an intermediate transfer member comprised of a mixture of carbon black, a first copolymer comprised of a polyester, a polycarbonate and a polyalkylene glycol, and a second copolymer.

Copending U.S. application Ser. No. 12/413,645, filed Mar. 30, 2009 on Layered Intermediate Transfer Members, illustrates an intermediate transfer member comprised of a polyimide substrate, and thereover a polyetherimide/polysiloxane.

Copending U.S. application Ser. No. 12/413,633 filed Mar. 30, 2009, entitled Fluorinated Sulfonic Acid Polymer Grafted Polyaniline Containing Intermediate Transfer Members, illustrates an intermediate transfer member comprised of a substrate, and in contact therewith a polyaniline having grafted thereto a fluorinated sulfonic acid polymer.

Copending U.S. application Ser. No. 12/413,638, filed Mar. 30, 2009, entitled Perfluoropolyether Polymer Grafted Polyaniline Containing Intermediate Transfer Members, illustrates an intermediate transfer member comprised of a substrate and in contact with the substrate a polyaniline grafted perfluoropolyether phosphoric acid polymer.

Copending U.S. application Ser. No. 12/413,642, filed Mar. 30, 2009, entitled Fluorotelomer Grafted Polyaniline Containing Intermediate Transfer Members, illustrates an intermediate transfer member comprised of a substrate, and a layer comprised of polyaniline having grafted thereto a fluorotelomer.

Copending U.S. application Ser. No. 12/413,651, filed Mar. 30, 2009, entitled Polyimide Polysiloxane Intermediate Transfer Members, illustrates an intermediate transfer member comprised of at least one of a polyimide/polyetherimide/polysiloxane, and a polyimide polysiloxane.

Illustrated in U.S. application Ser. No. 12/200,074, U.S. Publication No. 2010005546, entitled Hydrophobic Carbon Black Intermediate Transfer Components, filed Aug. 28, 2008, is an intermediate transfer member comprised of a substrate comprising a carbon black surface treated with a poly(fluoroalkyl acrylate).

Illustrated in U.S. application Ser. No. 12/129,995, U.S. Publication No. 20090297232, filed May 30, 2008, entitled Polyimide Intermediate Transfer Components, the disclosure of which is totally incorporated herein by reference, is an intermediate transfer belt comprised of a substrate comprising a polyimide and a conductive component wherein the polyimide is cured at a temperature of, for example, from about 175° C. to about 290° C. over a period of time of from about 10 to about 120 minutes.

Illustrated in U.S. application Ser. No. 12/550,594 entitled Carbon Nanotube Containing Intermediate Transfer Members, filed Aug. 31, 2009, is an intermediate transfer member comprised of a polyimide supporting substrate layer, and thereover a layer comprised of a photoinitiator, a polymer or a monomer, and a carbon nanotube.

Disclosed in copending application U.S. application Ser. No. 12/624,589, filed Nov. 24, 2009, entitled UV Cured Heterogeneous Intermediate Transfer Belts [ITB], the disclosure of which is totally incorporated herein by reference, is an intermediate transfer member comprising:

an ultraviolet (UV) curable polymer, wherein the UV curable polymer comprises a urethane acrylate;

a photoinitiator being capable of initiating a curing of the UV curable polymer; and a plurality of carbon nanotubes dispersed in the UV curable polymer in an amount sufficient to provide the cured UV polymer a surface resistivity ranging of about $10^8$ ohms/sq to about $10^{13}$ ohms/sq, wherein the plurality of carbon nanotubes is about 3% or less by weight of the cured polymer.

BACKGROUND

Disclosed are intermediate transfer members, and more specifically, intermediate transfer members useful in transferring images such as a developed image in an electrostatographic, for example xerographic, including digital, image on image, and the like, machines or apparatuses and printers, and yet more specifically, printers that generate images of various colors. In embodiments, there are selected intermediate transfer members comprised of an optional supporting substrate such as a polyimide first layer, and a UV (ultraviolet light) curable or UV cured second layer comprised of a conductive component such as carbon black, metal oxides and carbon nanotubes, or mixtures thereof dispersed in an organic inorganic hybrid formed, for example, by the condensation reaction of a bisphenol and a silane containing acrylate, and wherein the polyimide substrate layer when present further includes a conductive component, and wherein the second layer further includes an optional urethane acrylate polymer, a photoinitiator, and an acrylate monomer or a vinyl monomer.

A number of advantages are associated with the intermediate transfer members of the present disclosure in embodiments thereof, such as excellent mechanical characteristics, robustness, consistent, and excellent surface resistivities, excellent image transfer (toner transfer and cleaning), as compared to a number of known intermediate transfer members with a polyimide base layer; acceptable adhesion properties, when there is included in the plural layered intermediate transfer member an adhesive layer; excellent maintained conductivity or resistivity for extended time periods; dimensional stability; ITB (intermediate transfer belt) humidity insensitivity for extended time periods; excellent dispersability in a polymeric solution; low and acceptable surface friction characteristics; and minimum or substantially no peeling or separation of the layers.

More specifically, as UV curing technology matures, the intermediate transfer members illustrated herein provides almost zero VOC volatiles; preparation efficiencies, for example cured within seconds; excellent physical properties such as stain, abrasion, and solvent resistance together with superior toughness, and excellent gloss attainable by numerous coating methods.

Also, as compared to intermediate transfer members that include a number of conductive components, such as carbon black, the dispersed carbon nanotube intermediate transfer members of the present disclosure are UV curable due primarily to the excellent conductivity of the carbon nanotubes; and in embodiments, a small amount, such as 1 weight percent or less, of the carbon nanotubes can be selected to achieve a surface resistivity of, for example, from about $10^8$ to about $10^{13}$ ohm/sq for the intermediate transfer members disclosed herein.

Accordingly, in embodiments of the present disclosure, the carbon nanotube containing intermediate transfer members are UV curable when, for example, selected in amounts of about 1 weight percent which allows the UV light to penetrate across the carbon nanotube layer for a complete, almost 100 percent, cure. In comparison, carbon black containing intermediate transfer members usually select a high loading of about 5 weight percent to achieve a comparable resistivity (with less than 5 weight percent, the ITB resistivity may be out of the functional range, for example, over $10^{14}$ ohm/sq). Also, a carbon black containing layer substantially prevents UV light from penetrating deep into the layer, thus complete cure is difficult to obtain.

In aspects thereof, the present disclosure relates to a multi layer intermediate transfer member, such as a belt (ITB) comprised of an organic inorganic hybrid, and in embodiments, where the ITB is comprised of an organic inorganic hybrid material, a carbon nanotube surface layer and a polyimide base layer, where the polyimide layer further includes as an optional additive a conductive component, an optional adhesive layer situated therebetween, and which layered member can be prepared by known solution casting methods, and known extrusion molded processes with the optional adhesive layer being generated, and applied by known spray coating and flow coating processes.

In a typical electrostatographic reproducing apparatus, such as xerographic copiers, printers, multifunctional machines, a light image of an original to be copied is recorded in the form of an electrostatic latent image upon a photosensitive member or a photoconductor, and the latent image is subsequently rendered visible by the application of electroscopic thermoplastic resin particles and colorant. Generally, the electrostatic latent image is developed by contacting it with a developer mixture comprised of a dry developer mixture, which usually comprises carrier granules having toner particles adhering triboelectrically thereto, or a liquid developer material, which may include a liquid carrier having toner particles dispersed therein. The developer material is advanced into contact with the electrostatic latent image, and the toner particles are deposited thereon in image configuration. Subsequently, the developed image is transferred to a copy sheet. It is advantageous to transfer the developed image to a coated intermediate transfer web, belt or component, and subsequently, transfer with a high transfer efficiency the developed image from the intermediate transfer member to a permanent substrate. The toner image is subsequently usually fixed or fused upon a support, which may be the photosensitive member itself, or other support sheet such as plain paper.

Intermediate transfer members possess a number of advantages, such as enabling high throughput at modest process speeds; improving registration of the final color toner image in color systems using synchronous development of one or more component colors, and using one or more transfer stations; and increasing the number of substrates that can be selected. However, a disadvantage of using an intermediate transfer member is that a plurality of transfer operations is usually needed allowing for the possibility of charge exchange occurring between toner particles and the transfer member, which ultimately can lead to less than complete toner transfer, resulting in low resolution images on the image receiving substrate, and image deterioration. When the image is in color, the image can additionally suffer from color shifting and color deterioration.

Attempts at controlling the resistivity of intermediate transfer members by, for example, adding conductive fillers, such as ionic additives and/or carbon black to the outer layer, are disclosed in U.S. Pat. No. 6,397,034 which describes the use of fluorinated carbon filler in a polyimide intermediate transfer member layer. However, there can be problems associated with the use of such fillers in that undissolved particles frequently bloom or migrate to the surface of the fluorinated polymer and cause imperfections to the polymer, thereby causing nonuniform resistivity, which in turn causes poor antistatic properties and poor mechanical strength characteristics. Also, ionic additives on the ITB surface may interfere with toner release. Furthermore, bubbles may appear in the polymer, some of which can only be seen with the aid of a microscope, and others of which are large enough to be observed with the naked eye resulting in poor or nonuniform electrical properties, and poor mechanical properties.

In addition, the ionic additives themselves are sensitive to changes in temperature, humidity, and operating time. These sensitivities often limit the resistivity range. For example, the resistivity usually decreases by up to two orders of magnitude or more as the humidity increases from about 20 to 80 percent relative humidity. This effect limits the operational or process latitude.

Moreover, ion transfer can also occur in these systems. The transfer of ions leads to charge exchanges and insufficient transfers, which in turn causes low image resolution and image deterioration, thereby adversely affecting the copy quality. In color systems, additional adverse results include color shifting and color deterioration. Ion transfer also increases the resistivity of the polymer member after repetitive use. This can limit the process and operational latitude, and eventually the ion filled polymer member will be unusable.

Therefore, it is desired to provide an intermediate transfer member with a number of the advantages illustrated herein, inclusive of excellent mechanical, and humidity insensitivity characteristics, permitting high copy quality where developed xerographic images with minimal resolution issues can be obtained. It is also desired to provide a weldable intermediate transfer belt that may not, but could have puzzle cut seams, and instead has a weldable seam, thereby providing a belt that can be manufactured without labor intensive steps, such as manually piecing together the puzzle cut seam with fingers, and without the lengthy high temperature and high humidity conditioning steps. Also, it is desired to generate by environmental acceptable standards intermediate transfer members, thus for example, the intermediate transfer members of the present disclosure can be obtained in the absence of solution casting methods and where solvent evaporation is used.

REFERENCES

Disclosed in U.S. Pat. No. 6,139,784 is a seamless belt containing a conductive powder and a polyimide resin, and more specifically, processes for the preparation of seamless belts Illustrated in U.S. Pat. No. 7,031,647 is an imageable seamed belt containing a lignin sulfonic acid doped polyaniline.

Illustrated in U.S. Pat. No. 7,139,519 is an intermediate transfer belt, comprising a belt substrate comprising primarily at least one polyimide polymer; and a welded seam.

Illustrated in U.S. Pat. No. 7,130,569 is a weldable intermediate transfer belt comprising a substrate comprising a homogeneous composition comprising a polyaniline in an amount of, for example, from about 2 to about 25 percent by weight of total solids, and a thermoplastic polyimide present in an amount of from about 75 to about 98 percent by weight of total solids, wherein the polyaniline has a particle size of, for example, from about 0.5 to about 5 microns.

Puzzle cut seam members are disclosed in U.S. Pat. Nos. 5,487,707; 6,318,223; and 6,440,515.

Illustrated in U.S. Pat. No. 6,602,156 is a polyaniline filled polyimide puzzle cut seamed belt, however, the manufacture of a puzzle cut seamed belt is labor intensive and costly, and the puzzle cut seam, in embodiments, is sometimes weak. The manufacturing process for a puzzle cut seamed belt usually involves a lengthy in time high temperature and high humidity conditioning step. For the conditioning step, each individual belt is rough cut, rolled up, and placed in a conditioning chamber that is environmentally controlled at about 45° C. and about 85 percent relative humidity, for approximately 20 hours. To prevent or minimize condensation and watermarks, the puzzle cut seamed transfer belt resulting is permitted to remain in the conditioning chamber for a suitable period of time, such as 3 hours. The conditioning of the transfer belt renders it difficult to automate the manufacturing thereof, and the absence of such conditioning may adversely impact the belts electrical properties, which in turn results in poor image quality.

EMBODIMENTS

In aspects thereof there is disclosed an intermediate transfer member comprised of an optional supporting substrate, and a mixture of a carbon nanotube, a photoinitiator, and a hybrid component formed by the reaction of a bisphenol and a silane acrylate; an intermediate transfer member comprised of a supporting substrate first layer, and a second surface layer comprised of a mixture of a carbon nanotube, a photoinitiator, and an organic inorganic hybrid component as represented by the following formulas/structures

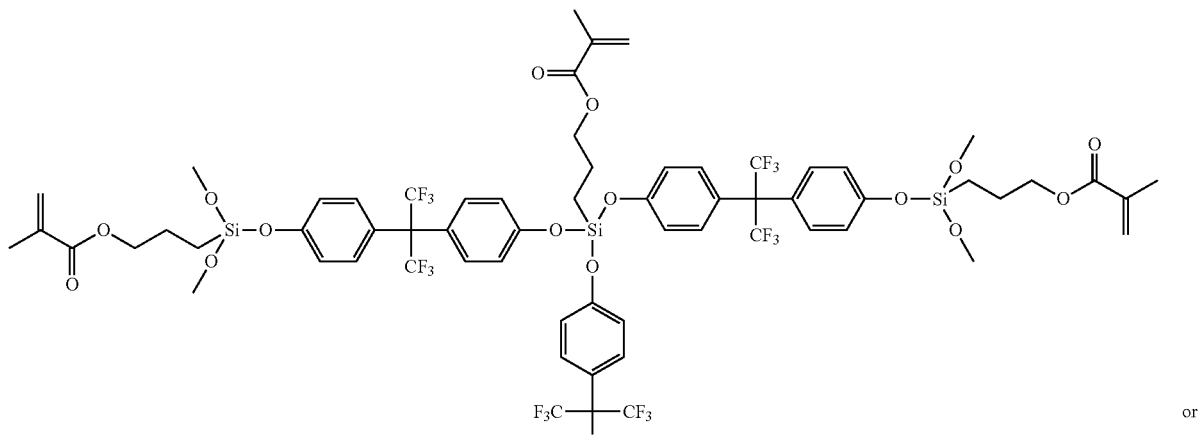

or

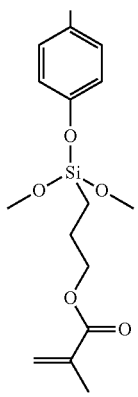

-continued

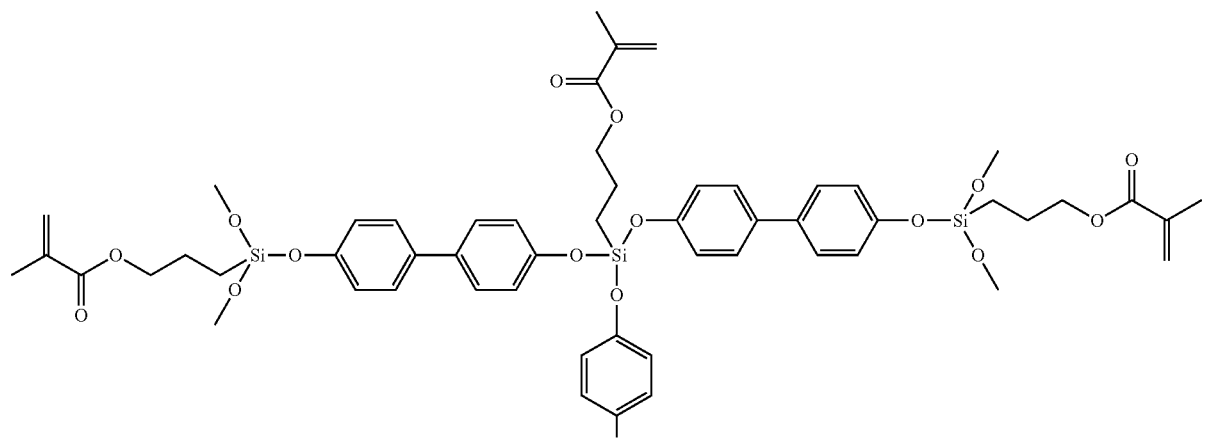

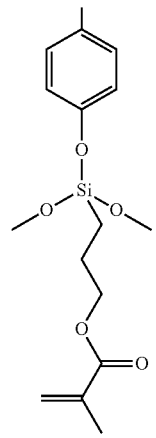

wherein the photoinitiator is represented by

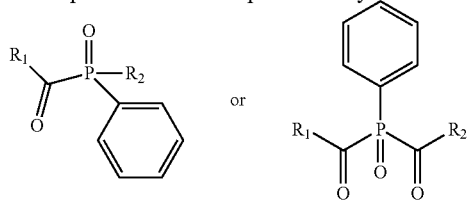

wherein R is alkyl, aryl, or mixtures thereof, and wherein the layer mixture has added thereto a vinyl monomer, an acrylate monomer, or a urethane acrylate; an intermediate transfer member comprised of an optional supporting substrate, and a surface layer thereover comprised of a component represented by the following formulas/structures

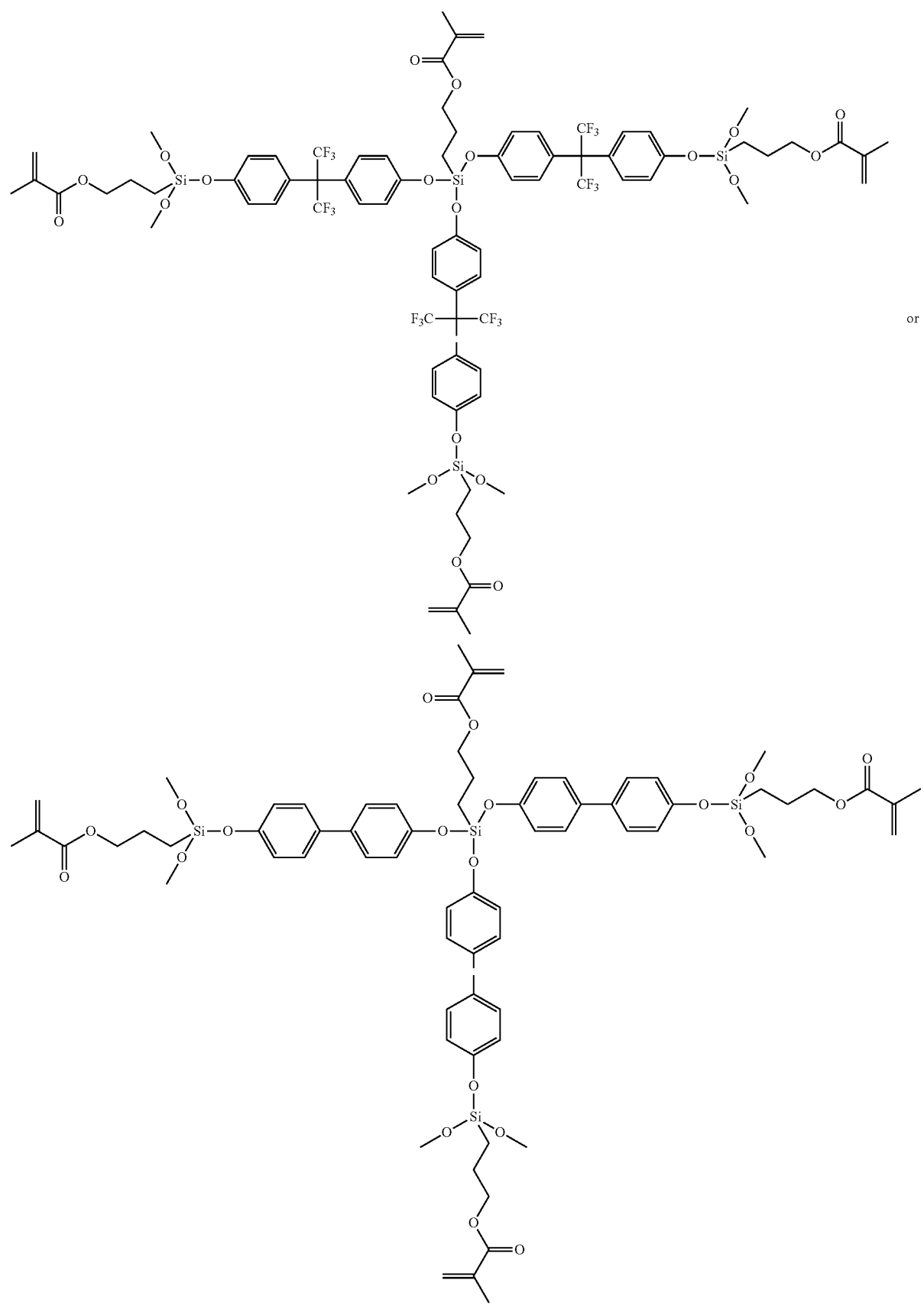
or and optionally an acrylate monomer, or a urethane acrylate; an intermediate transfer member comprised of a supporting substrate, and a coating thereover comprised of a mixture of an organic inorganic hybrid as illustrated herein, and as an optional component a carbon nanotube; an intermediate transfer member comprised of a polyimide supporting substrate layer, and thereover a layer comprised of a mixture of an organic inorganic hybrid as illustrated herein, a photoinitiator, a polymer or a monomer, and a carbon nanotube, and wherein the carbon nanotube containing layer has been subjected to exfoliation and debundling, and where this layer is UV curable; an intermediate transfer member comprised of a polyimide supporting substrate layer, and thereover a surface layer comprised of a mixture of an organic inorganic material and a conductive carbon nanotube comprised of fullerenes, and wherein the carbon nanotube has been subjected to exfoliation and debundling by the mixing of the carbon nanotube with a dispersant, and wherein the surface layer includes an acrylate monomer or a vinyl monomer, and a photoinitiator as represented by

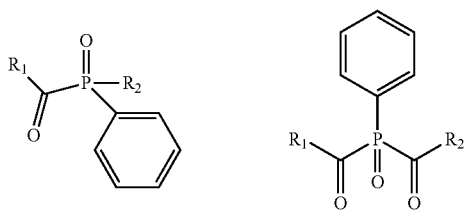

wherein R is alkyl, aryl, or mixtures thereof, and wherein the dispersant is represented by wherein n represents the number of repeating segments, and

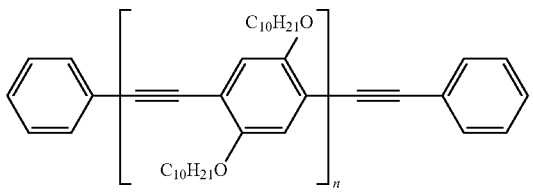

wherein n represents the number of repeating segments, examples of n being from 1 to about 225 (includes numbers therebetween throughout), from about 5 to about 100, from about 50 to about 125, from about 10 to about 75, and the like; a transfer media comprised of a polyimide first supporting substrate layer, and thereover a second layer comprised of a carbon nanotube as illustrated herein dispersed in an organic inorganic hybrid, an adhesive layer situated between the first layer and the second layer, and wherein the first layer further contains a known conductive component like carbon black, a polyaniline, and the like; an intermediate transfer belt comprised of an optional polyimide substrate layer, and thereover a layer comprised of a carbon nanotube, which is exfoliated and debundled, dispersed in the hybrid component illustrated herein, and wherein the optional substrate layer further includes a conductive component, wherein the substrate is of a thickness of from about 20 to about 500 microns, and the exfoliated and debundled carbon nanotube layer is of a thickness of from about 1 to about 150 microns, wherein carbon nanotube is present in an amount of from about 0.1 to about 10, or from about 0.5 to about 3 weight percent, and wherein the total of the components in this layer is about 100 percent;

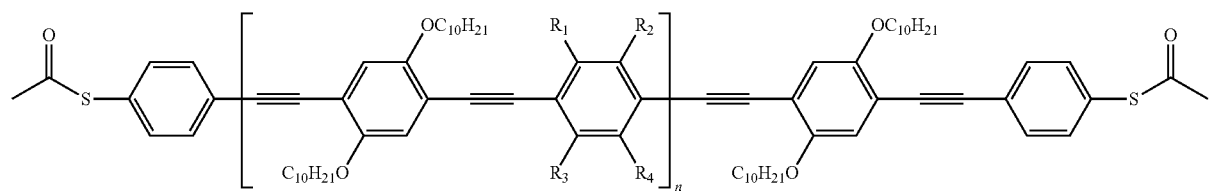

wherein when $R_1$ and $R_4$ are hydrogen, $R_2$ and $R_3$ are $OC_{10}H_{21}$; wherein $R_1$, $R_2$, $R_3$ and $R_4$ are a halide; or wherein when $R_1$ and $R_4$ are hydrogen, $R_2$ and $R_3$ are

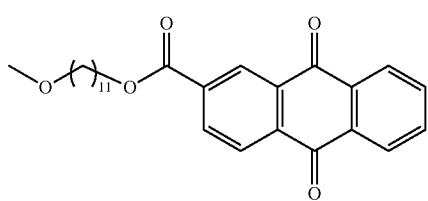

an intermediate transfer member comprising, for example, a polyimide supporting substrate, and thereover an exfoliated and debundled carbon nanotube and hybrid mixture layer that further includes a polymer selected from the group consisting of a polyimide, a polycarbonate, a polyamideimide, a polyphenylene sulfide, a polyamide, a polysulfone, a polyetherimide, a polyester, a polyvinylidene fluoride, a polyethylene-co-polytetrafluoroethylene, and mixtures thereof present in an amount of from about 1 to about 80 weight percent.

Disclosed herein is an intermediate transfer member comprised of a supporting substrate first layer, and a second surface layer comprised of a mixture of a carbon nanotube, a photoinitiator, and an organic inorganic hybrid component as represented by the following formulas/structures 13 14
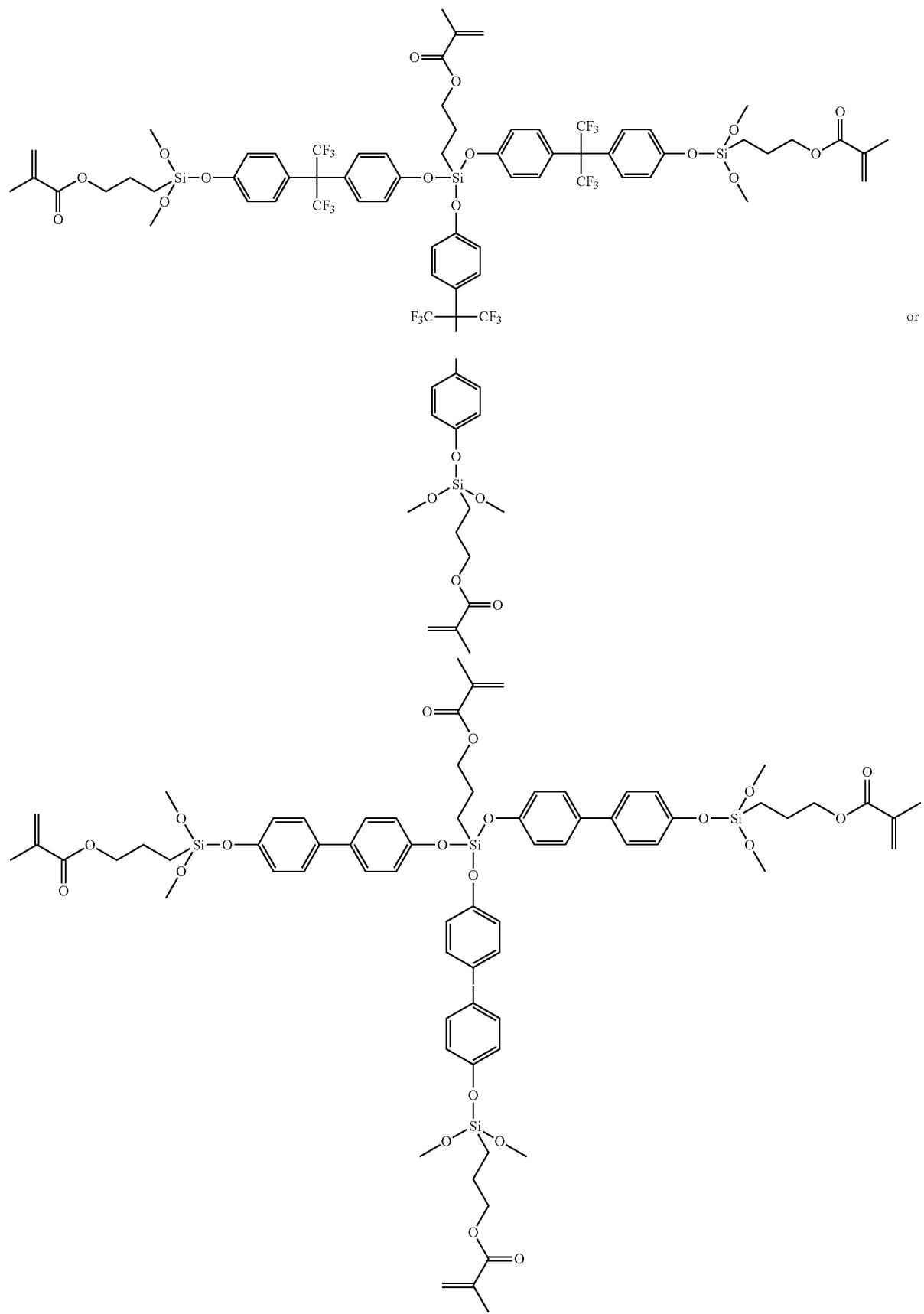

wherein said photoinitiator is represented by

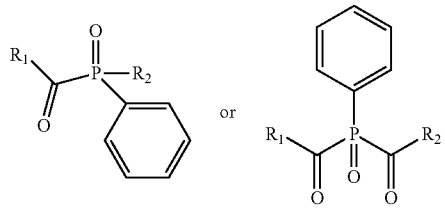 or 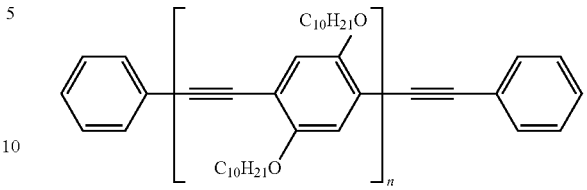

wherein $R_1$ and $R_2$ are alkyl, aryl, or mixtures thereof, and optionally wherein the layer hybrid mixture has added thereto a vinyl monomer, an acrylate monomer, or a urethane acrylate; an intermediate transfer wherein the photoinitator is selected from the group consisting of diphenyl (2,4,6-trimethylbenzoyl)phosphine oxide, diphenyl(2,4,6-trimethylbenzoyl) phosphinate, phenyl bis(2,4,6-trimethyl benzoyl) phosphine oxide, 1-hydroxy-cyclohexylphenyl ketone, 2-hydroxy-2-methyl-1-phenyl-1-propanone, 2-hydroxy-1-[4-(2-hydroxyethoxy)phenyl]-2-methyl-1-propanone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, and α,α-dimethoxy-α-phenylacetophenone, each present in an amount of from about 1 to about 7 weight percent; the hybrid is the reaction product of 2,2-bis(4-hydroxyphenyl)hexafluoropropane and 3-acryloyloxypropyl trimethoxysilane, or 4,4'-dihydroxybiphenyl and 3-acryloyloxypropyl trimethoxysilane; and wherein the carbon nanotube is treated with a dispersant as represented by at least one of wherein n represents the number of repeating segments; and

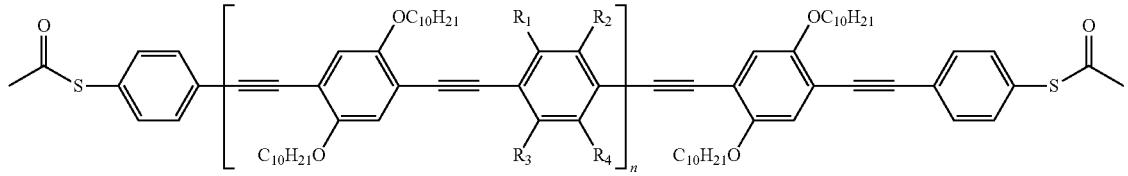

wherein n represents the number of repeating segments, and optionally which hybrid containing layer mixture has added thereto a vinyl monomer, an acrylate monomer; or a urethane acrylate; and an intermediate transfer wherein the carbon nanotube is a fullerene present in an amount of from about 0.5 to about 10 weight percent, the hybrid is formed by the reaction of 2,2-bis(4-hydroxyphenyl)hexafluoropropane and 3-acryloyloxypropyl trimethoxysilane, or 4,4'-dihydroxybiphenyl and 3-acryloyloxypropyl trimethoxysilane, the hybrid being present in an amount of from about 10 to about 90 weight percent, and where for the dispersant formulas n is a number of from about 10 to about 150.

Alkyl for the dispersant contains, for example, from about 1 to about 25 carbon atoms, from 1 to about 18 carbon atoms, from 1 to about 12 carbon atoms, from 1 to about 6 carbon atoms; and aryl contains, for example, from 6 to about 36 carbon atoms, from 6 to about 24 carbon atoms, from 6 to about 18 carbon atoms, from 6 to 12 carbon atoms. Addition-

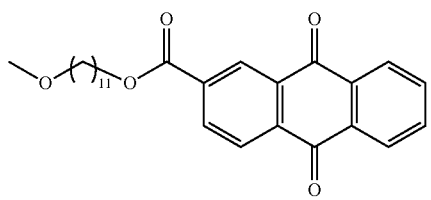

wherein when $R_1$ and $R_4$ are hydrogen, $R_2$ and $R_3$ are $OC_{10}H_{21}$; wherein $R_1$, $R_2$, $R_3$ and $R_4$ are a halide, alkyl or aryl; or wherein when $R_1$ and $R_4$ are hydrogen, $R_2$ and $R_3$ are ally, the alkyl and aryl substituents include substituted derivatives thereof. Specific alkyls are methyl, ethyl, propyl, butyl, pentyl, hexyl, and the like, while examples of aryl are phenyl, anthryl, benzyl, and the like.

In embodiments to, for example, achieve a high conductivity, such as a surface resistivity of from about $10^6$ to about $10^{12}$ ohm/sq, especially when about 1 weight percent or less of the carbon nanotubes are present for the intermediate transfer members illustrated herein the carbon nanotubes (CNT) are exfoliated and debundled (each CNT is separated rather than aggregated with others). Zyvex Performance Materials (Columbus, Ohio) has developed a proprietary technology to exfoliate and debundle CNT, where CNT is dispersed with the aid of a dispersant, reference the *Journal of The American Chemical Society*, 124, 9034, 2002, and as illustrated below

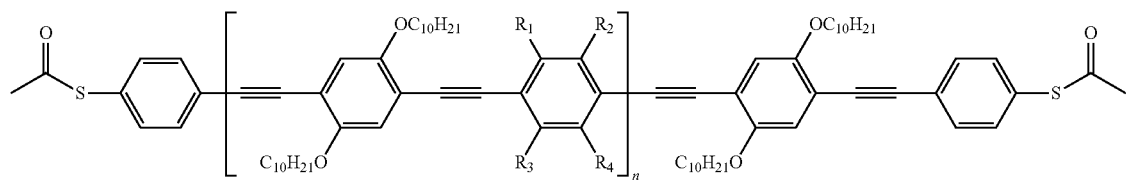

wherein when $R_1$ and $R_4$ are hydrogen, $R_2$ and $R_3$ are $OC_{10}H_{21}$; wherein $R_1$, $R_2$, $R_3$ and $R_4$ are a halide; or wherein when $R_1$ and $R_4$ are hydrogen, $R_2$ and $R_3$ are

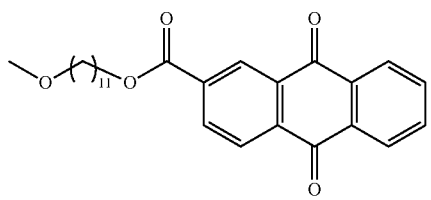

wherein n represents the number of repeating segments, and F is a halide, and more specifically, fluoride; and generally wherein it is envisioned that each R substituent may be alkyl, alkoxy, or aryl, however, it is not desired to be limited by theory, and

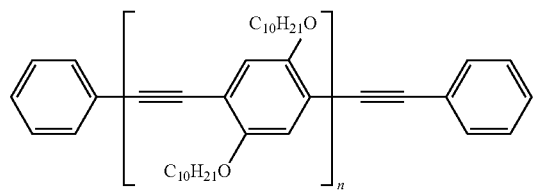

wherein n represents the number of repeating segments.

The weight ratio of the CNT to the dispersant is, for example, from about 95/5 to about 60/40, or from about 90/10 to about 70/30, or 83.3/16.7. Specific examples of the CNT dispersion comprise a multi-walled nanotube (MWNT)/dispersant selected in a ratio of about 83.3/16.7 in methylene chloride, about 0.78 weight percent solids, available from Zyvex Performance Materials.

Carbon nanotubes (CNTs) are known and generally refer to allotropes of carbon with a cylindrical nanostructure. Nanotubes can be constructed with a length-to-diameter ratio of up to 28,000,000:1.

Nanotubes are members of the fullerene structural family, which also includes spherical shaped buckyballs. The ends of a nanotube might be capped with a hemisphere of the buckyball structure. Their name is derived from their size since the diameter of a nanotube is, for example, on the order of a few nanometers (approximately 1/50,000th of the width of a human hair), while they can be up to several millimeters in length. Nanotubes are categorized as single-walled nanotubes (SWNTs) and multi-walled nanotubes (MWNTs).

Compared with conductive components, such as a substantially nondispersed carbon black, the carbon nanotubes dispersion is excellent, and also carbon nanotubes, even at small amounts, such as about 1 weight percent, are in general about 6 to about 7 orders of magnitude more conductive that carbon black. In addition, carbon nanotubes when incorporated at such a small amounts, allow the UV light to penetrate across the layer for a complete cure. In comparison, carbon black usually requires high loading of about 5 to about 20 weight percent to achieve comparable resistivity or conductivity as a carbon nanotube and carbon blacks prevent UV light penetration deep into the layer, thus complete cure is difficult.

The disclosed organic-inorganic hybrid component selected for the UV cured surface layer or second layer can be generated in embodiments by the reaction of a bisphenol and a silane acrylate, and more specifically, the hybrid component was synthesized as follows. Methacryloxypropyl trimethoxysilane (Z-6030, obtained from Dow Corning), 5.6 grams, calcium hydroxide, 0.002 gram, 2,2'-bis(4-hydroxyphenyl) hexafluoropropane (Bisphenol AF), 12.4 grams, and the solvent THF, 100 grams, were magnetically stirred and heated to reflux for 6 hours. Then, about 90 milliliters of THF were distilled off, resulting in a clear slightly yellowish liquid.

Examples of bisphenols are selected from the group consisting of 2,2-bis(4-hydroxyphenyl)hexafluoropropane (bisphenol AF), 2,2-bis(4-hydroxyphenyl)propane (bisphenol A), 4,4'-(1,3-phenylenediisopropylidene)bisphenol (bisphenol M), 4,4'-(1,4-phenylenediisopropylidene)bisphenol (bisphenol P), 4,4'-(1-phenylethylidene)bisphenol (bisphenol AP), 4,4'-cyclohexylidenebisphenol (bisphenol Z), 4,4'-ethylidenebisphenol (bisphenol E), 4,4'-isopropylidenebis(2,6-dimethylphenol)(tetramethyl bisphenol A), bis-(4-hydroxyphenyl)methane (bisphenol F), bis(4-hydroxyphenyl)sulfone (bisphenol S), 4,4'-isopropylidenebis(2,6-dibromophenol), 4,4'-(9-fluorenylidene)diphenol, 4,4'-dihydroxybiphenyl, 4,4'-sulfonylbis(2-methylphenol), 4,4'-thiodiphenol, 2,2-bis(4-hydroxy-3-methylphenyl)propane, represented by

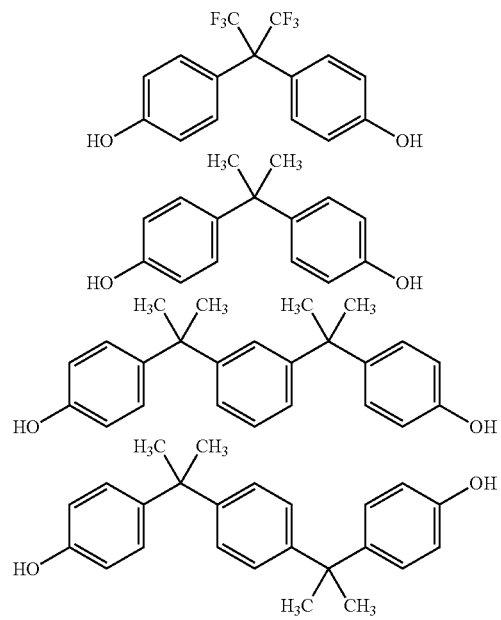

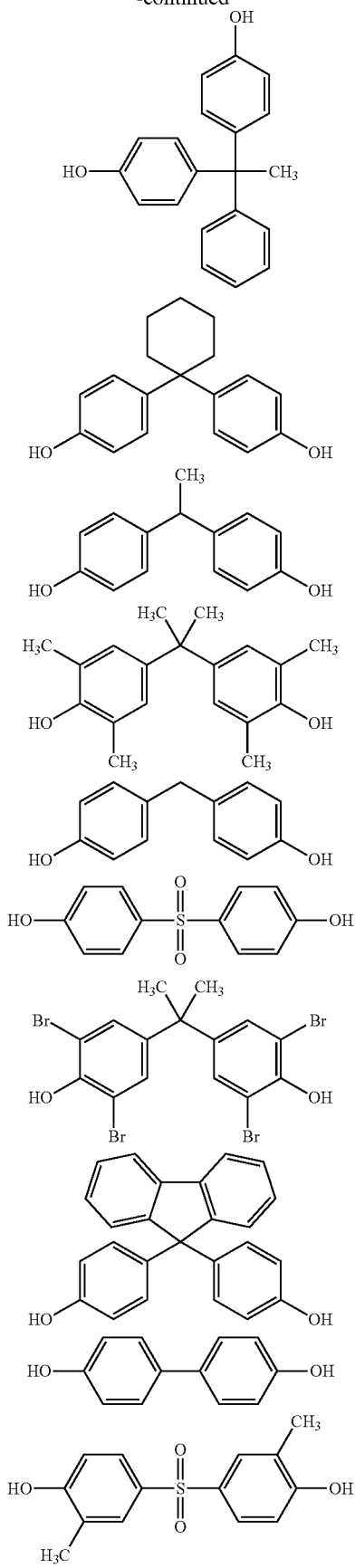

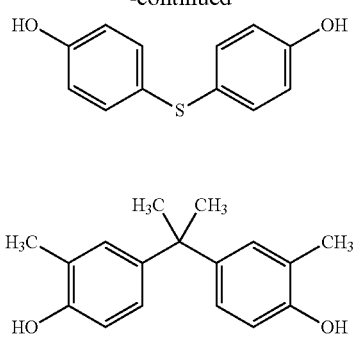

and the like, and mixture thereof.

Examples of silane acrylates selected are represented by

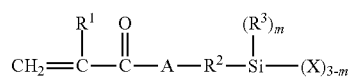

wherein $R^1$ represents a hydrogen atom or alkyl, such as lower alkyl group; A represents —O— or —NH—; $R^2$ represents an alkylene, such as an alkylene containing from 1 to about 6 carbon atoms; $R^3$ represents an alkyl, such as a lower alkyl group; X represents alkoxy like a lower alkoxy group or a halogen atom; and m represents 0, 1 or 2. Alkyl and alkoxy include those groups with, for example, from 1 to about 12, from 1 to about 10, from 1 to about 6, from 1 to about 4 carbon atoms. Lower alkyl and lower alkoxy include, for example, from 1 to about 6, from 1 to about 4, and from 2 to about 4 carbon atoms. Halide includes, for example, fluoride, bromide, iodide, and bromide.

Specific examples of the silane acrylates are selected from the group consisting of 3-(meth)acryloyloxypropyl trimethoxysilane, 3-(meth)acryloyloxypropyl triethoxysilane, 3-(meth)acryloyloxypropylmethyl dimethoxysilane, 3-(meth)acryloyloxypropylmethyl diethoxysilane, 3-(meth)acryloyloxypropyldimethyl methoxysilane, 3-(meth)acryloyloxypropyldimethyl ethoxysilane, N-(trimethoxysilyl)propyl(meth)acrylamide, N-(triethoxysilyl)propyl(meth)acrylamide, 3-(meth)acryloyloxypropyl trichlorosilane, 3-(meth)acryloyloxypropylmethyl dichlorosilane, 3-(meth)acryloyloxypropyldimethyl chlorosilane, and the like, and mixtures thereof.

In embodiments, a bisphenol and a silane acrylate are reacted at a mole ratio of from about 1/3 to about 2/1, or from about 1/2 to about 1.5/1 in the presence of a basic catalyst selected in an amount of from about 0.1 to about 10 weight percent. Examples of the catalyst include calcium hydroxide, calcium oxide, magnesium hydroxide, magnesium oxide, barium hydroxide, barium oxide, imidazoles, and the like. The resulting inorganic organic hybrid material possesses, for example, a weight average molecular weight of from about 300 to about 5,000, or from about 500 to about 3,000 and a number average molecular weight of from about 200 to about 4,000, and about 400 to about 2,500 as determined by Gel Permeation Chromatography, or by similar instruments, and by similar known methods.

Examples of the organic inorganic hybrid material or component are represented by 21
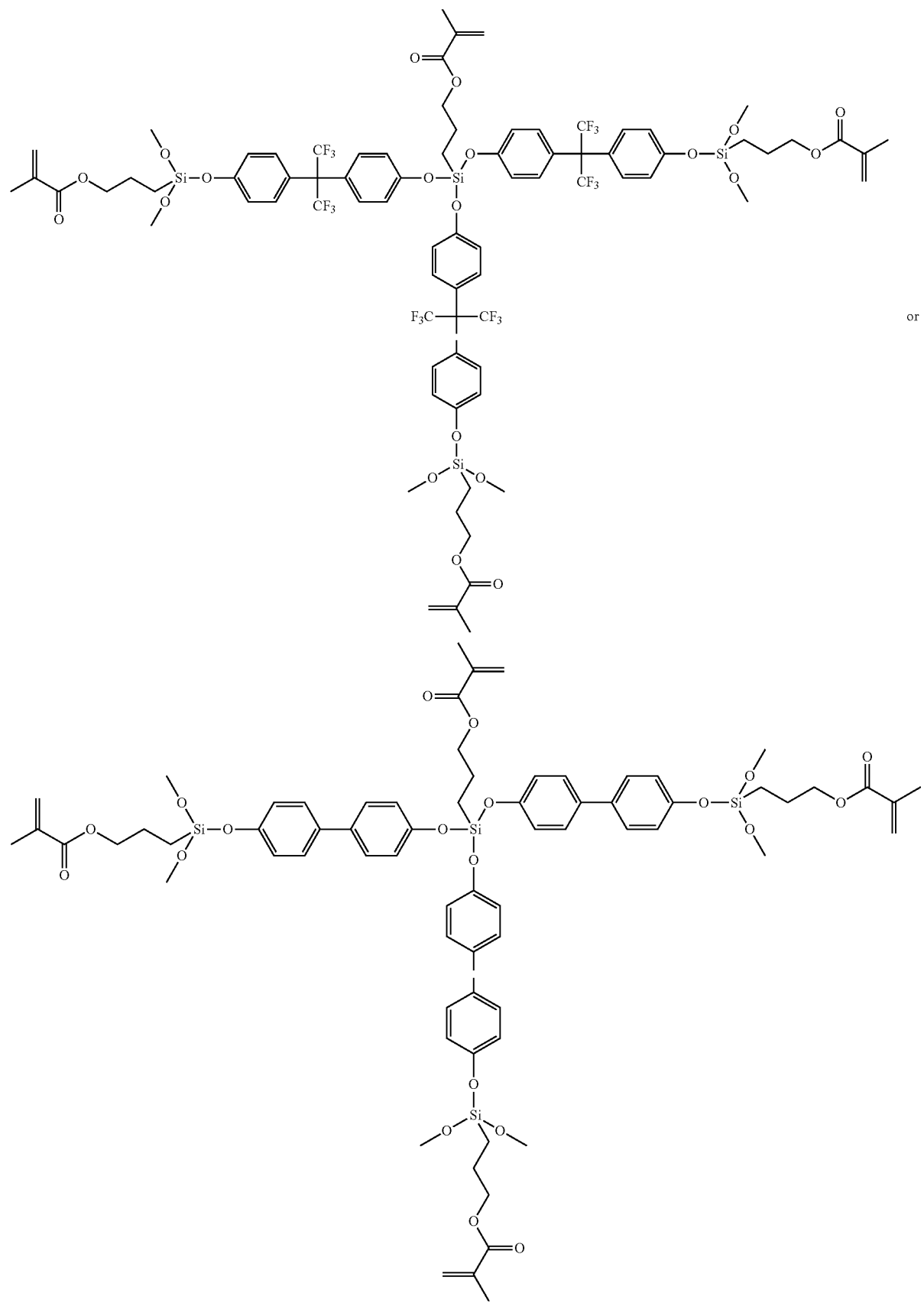
22
or Examples of supporting substrates include polyimides, polyamideimides, polyetherimides, and mixtures thereof.

Specific examples of supporting substrates are polyimides inclusive of known low temperature and rapidly cured polyimide polymers, such as VTEC™ PI 1388, 080-051, 851, 302, 203, 201, and PETI-5, all available from Richard Blaine International, Incorporated, Reading, Pa. These thermosetting polyimides can be cured at temperatures of from about 180° C. to about 260° C. over a short period of time, such as from about 10 to about 120 minutes, or from about 20 to about 60 minutes; possess a number average molecular weight of from about 5,000 to about 500,000, or from about 10,000 to about 100,000, and a weight average molecular weight of from about 50,000 to about 5,000,000, or from about 100,000 to about 1,000,000. Also, for the supporting substrate there can be selected thermosetting polyimides that can be cured at temperatures of above 300° C., such as PYRE M.L.® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100 commercially available from FUJIFILM Electronic Materials U.S.A., Inc., North Kingstown, R.I.; and KAPTON® HN, VN and FN, all commercially available from E.I. DuPont, Wilmington, Del.

Suitable supporting substrate polyimides include those formed from various diamines and dianhydrides, such as polyimide, polyamideimide, polyetherimide, and the like. More specifically, polyimides include aromatic polyimides, such as those formed by reacting pyromellitic acid and diaminodiphenylether, or by imidization of copolymeric acids, such as biphenyltetracarboxylic acid and pyromellitic acid with two aromatic diamines, such as p-phenylenediamine and diaminodiphenylether. Another suitable polyimide includes pyromellitic dianhydride and benzophenone tetracarboxylic dianhydride copolymeric acids reacted with 2,2-bis[4-(8-aminophenoxy)phenoxy]-hexafluoropropane. Aromatic polyimides include those containing 1,2,1',2'-biphenyltetracarboximide and para-phenylene groups, and those having biphenyltetracarboximide functionality with diphenylether end spacer characterizations. Mixtures of polyimides can also be used.

In embodiments, the polyamideimides can be synthesized by at least the following two methods (1) isocyanate method which involves the reaction between isocyanate and trimellitic anhydride; or (2) acid chloride method where there is reacted a diamine and trimellitic anhydride chloride. Examples of these polyamideimides include VYLOMAX® HR-11NN (15 weight percent solution in N-methylpyrrolidone, $T_g=300°$ C., and $M_w=45,000$), HR-12N2 (30 weight percent solution in N-methylpyrrolidone/xylene/methyl ethyl ketone=50/35/15, $T_g=255°$ C., and $M_w=8,000$), HR-13NX (30 weight percent solution in N-methylpyrrolidone/xylene=67/33, $T_g=280°$ C., and $M_w=10,000$), HR-15ET (25 weight percent solution in ethanol/toluene=50/50, $T_g=260°$ C., and $M_w=10,000$), HR-16NN (14 weight percent solution in N-methylpyrrolidone, $T_g=320°$ C., and $M_w=100,000$), all commercially available from Toyobo Company of Japan, and TORLON® AI-10 ($T_g=272°$ C.), commercially available from Solvay Advanced Polymers, LLC, Alpharetta, Ga.

Examples of polyetherimide supporting substrates are ULTEM® 1000 ($T_g=210°$ C.), 1010 ($T_g=217°$ C.), 1100 ($T_g=217°$ C.), 1285, 2100 ($T_g=217°$ C.), 2200 ($T_g=217°$ C.), 2210 ($T_g=217°$ C.), 2212 ($T_g=217°$ C.), 2300 ($T_g=217°$ C.), 2310 ($T_g=217°$ C.), 2312 ($T_g=217°$ C.), 2313 ($T_g=217°$ C.), 2400 ($T_g=217°$ C.), 2410 ($T_g=217°$ C.), 3451 ($T_g=217°$ C.), 3452 ($T_g=217°$ C.), 4000 ($T_g=217°$ C.), 4001 ($T_g=217°$ C.), 4002 ($T_g=217°$ C.), 4211 ($T_g=217°$ C.), 8015, 9011 ($T_g=217°$ C.), 9075, and 9076, all commercially available from Sabic Innovative Plastics.

The conductive material, such as a carbon black, a metal oxide or a polyaniline, is present in the substrate layer of the intermediate transfer member in, for example, an amount of from about 1 to about 50 weight percent, from about 3 to about 40 weight percent, or specifically from about 5 to about 15 weight percent.

The conductivity of carbon black is dependent on surface area and its structure primarily. Generally, the higher the surface area and the higher the structure, the more conductive is the carbon black. Surface area is measured by the B.E.T. nitrogen surface area per unit weight of carbon black, and is the measurement of the primary particle size. Structure is a complex property that refers to the morphology of the primary aggregates of carbon black. It is a measure of both the number of primary particles comprising primary aggregates, and the manner in which they are "fused" together. High structure carbon blacks are characterized by aggregates comprised of many primary particles with considerable "branching" and "chaining", while low structure carbon blacks are characterized by compact aggregates comprised of fewer primary particles. Structure is measured by dibutyl phthalate (DBP) absorption by the voids within carbon blacks. The higher the structure, the more the voids, and the higher the DBP absorption.

Examples of carbon blacks selected as the conductive component for the ITM (intermediate transfer member) include VULCAN® carbon blacks, REGAL® carbon blacks, MONARCH® carbon blacks, and BLACK PEARLS® carbon blacks available from Cabot Corporation. Specific examples of conductive carbon blacks are BLACK PEARLS® 1000 (B.E.T. surface area=343 $m^2/g$, DBP absorption=1.05 ml/g), BLACK PEARLS® 880 (B.E.T. surface area=240 $m^2/g$, DBP absorption=1.06 ml/g), BLACK PEARLS® 800 (B.E.T. surface area=230 $m^2/g$, DBP absorption=0.68 ml/g), BLACK PEARLS® L (B.E.T. surface area=138 $m^2/g$, DBP absorption=0.61 ml/g), BLACK PEARLS® 570 (B.E.T. surface area=110 $m^2/g$, DBP absorption=1.14 ml/g), BLACK PEARLS® 170 (B.E.T. surface area=35 $m^2/g$, DBP absorption=1.22 ml/g), VULCAN® XC72 (B.E.T. surface area=254 $m^2/g$, DBP absorption=1.76 ml/g), VULCAN® XC72R (fluffy form of VULCAN® XC72), VULCAN® XC605, VULCAN® XC305, REGAL 660 (B.E.T. surface area=112 $m^2/g$, DBP absorption=0.59 ml/g), REGAL® 400 (B.E.T. surface area=96 $m^2/g$, DBP absorption=0.69 ml/g), REGAL® 330 (B.E.T. surface area=94 $m^2/g$, DBP absorption=0.71 ml/g), MONARCH® 880 (B.E.T. surface area=220 $m^2/g$, DBP absorption=1.05 ml/g, primary particle diameter=16 nanometers), and MONARCH® 1000 (B.E.T. surface area=343 $m^2/g$, DBP absorption=1.05 ml/g, primary particle diameter=16 nanometers); Channel carbon blacks available from Evonik-Degussa; Special Black 4 (B.E.T. surface area=180 $m^2/g$, DBP absorption=1.8 ml/g, primary particle diameter=25 nanometers), Special Black 5 (B.E.T. surface area=240 $m^2/g$, DBP absorption=1.41 ml/g, primary particle diameter=20 nanometers), Color Black FW1 (B.E.T. surface area=320 $m^2/g$, DBP absorption=2.89 ml/g, primary particle diameter=13 nanometers), Color Black FW2 (B.E.T. surface area=460 $m^2/g$, DBP absorption=4.82 ml/g, primary particle diameter=13 nanometers), and Color Black FW200 (B.E.T. surface area=460 $m^2/g$, DBP absorption=4.6 ml/g, primary particle diameter=13 nanometers).

Adhesive layer component hybrid mixture usually situated between the supporting substrate, and the top carbon nanotube layer thereover are, for example, a number of resins or polymers of epoxy, urethane, silicone, polyester, and the like. Generally, the adhesive layer is a solventless layer, that is, materials that are liquid at room temperature (about 25° C.), and are able to crosslink to an elastic or rigid film to adhere at least two materials together. Specific adhesive layer components include 100 percent solids adhesives including polyurethane adhesives obtained from Lord Corporation, Erie, Pa., such as TYCEL® 7924 (viscosity from about 1,400 to about 2,000 cps), TYCEL® 7975 (viscosity from about 1,200 to about 1,600 cps) and TYCEL® 7276. The viscosity range of the adhesives is, for example, from about 1,200 to about 2,000 cps. The solventless adhesives can be activated with either heat, room temperature curing, moisture curing, ultraviolet radiation, infrared radiation, electron beam curing, or any other known technique. The thickness of the adhesive layer is usually less than about 100 nanometers, and more specifically, as illustrated hereinafter.

The thickness of each layer of the intermediate transfer member can vary, and is usually not limited to any specific value. In specific embodiments, the substrate layer or first layer thickness is, for example, from about 20 to about 300 microns, from about 30 to about 200 microns, from about 75 to about 150 microns, and from about 50 to about 100 microns, while the thickness of the top carbon nanotube layer is, for example, from about 1 to about 150 microns, from about 10 to about 100 microns, from about 20 to about 70 microns, and from about 30 to about 50 microns. The adhesive layer thickness is, for example, from about 1 to about 100 nanometers, from about 5 to about 75 nanometers, or from about 50 to about 100 nanometers.

The carbon nanotube hybrid layer optionally includes, in embodiments, a urethane acrylate, and a photoinitiator, such as acyl phosphine, an acrylate monomer, or a vinyl monomer, or mixtures thereof.

More specifically, in embodiments, in addition to the inclusion therein of a synthetic organic-inorganic hybrid material, a photoinitiator, and carbon nanotube, acrylates or vinyl monomers can be incorporated therein including LAROMER® TMPTA (trimethylolpropane triacrylate), BDDA (butanediol diacrylate), HDDA (hexanediol diacrylate), TPGDA (tripropyleneglycol diacrylate), DPGDA (dipropyleneglycol diacrylate), POEA (phenoxyethyl acrylate), LR8887 (trimethylolpropaneformal monoacrylate), TBCH (4-t-butylcyclohexyl acrylate), LA (lauryl acrylate 12/14), EDGA (ethyldiglycol acrylate), BDMA (butandiol monoacrylate), DCPA (dihydrodicyclopentadienyl acrylate), DVE-3 (triethyleneglycol divinyl ether), vinyl caprolactam, n-vinyl formamide, all available from BASF; and CN4000 (fluorinated acrylate oligomer), available from Sartomer Co., Warrington, Pa., and the like, and mixtures thereof, present in an amount of from about 1 to about 40 weight percent, or from about 5 to about 20 weight percent of the total ITB layer.

The acrylate monomers or vinyl monomers function, for example, as diluents to reduce the viscosity of the coating dispersion, and solvents for the photoinitiators, and crosslink with the urethane acrylates by UV radiation to further provide for the carbon nanotube layer integrity and strength.

Examples of the urethane acrylates that are included in the surface layer include aromatic urethane acrylates and aliphatic urethane acrylates, and their mixtures thereof.

Specific examples of the aromatic urethane acrylates include CN2901, an aromatic urethane triacrylate oligomer ($T_g=35°$ C.); CN2902, an aromatic urethane triacrylate oligomer ($T_g=25°$ C.); CN9782, a difunctional aromatic urethane acrylate oligomer; CN9783, a difunctional aromatic urethane acrylate oligomer; CN992, an aromatic polyester based urethane diacrylate oligomer; CN994, an aromatic urethane acrylate oligomer ($T_g=50°$ C.); CN999, a low viscosity aromatic urethane oligomer ($T_g=35°$ C.); CN997, a hexafunctional aromatic urethane acrylate oligomer; CN2600, a brominated aromatic urethane acrylate oligomer ($T_g=88.8°$ C.); CN902J75, a brominated urethane acrylate oligomer containing 25 percent isobornyl acrylate; CN975, a hexafunctional aromatic urethane acrylate oligomer ($T_g=-12°$ C.); CN978, an aromatic polyether based urethane diacrylate oligomer ($T_g=-40°$ C.); CN972, an aromatic polyether based urethane triacrylate oligomer ($T_g=-47°$ C.); CN9022, a urethane acrylate ester ($T_g=-16°$ C.), all available from Sartomer Company, Inc., Exton, Pa.; and LAROMER® UA 9031V, available from BASF.

Specific examples of the aliphatic urethane acrylates include CN9002, a difunctional aliphatic urethane acrylate oligomer; CN9004, a difunctional aliphatic urethane acrylate oligomer; CN9005, a difunctional aliphatic urethane acrylate oligomer ($T_g=-10°$ C.); CN9006, a hexafunctional aliphatic urethane acrylate oligomer ($T_g=83°$ C.); CN9007, a difunctional aliphatic urethane acrylate oligomer; CN9178, a difunctional aliphatic urethane acrylate oligomer; CN9290US, a difunctional aliphatic urethane acrylate oligomer ($T_g=28°$ C.); CN940, a difunctional aliphatic urethane oligomer; CN9788, a difunctional aliphatic urethane oligomer; CN989, a trifunctional aliphatic urethane acrylate oligomer; CN9893, a difunctional aliphatic urethane oligomer; CN996, a urethane acrylate oligomer; CN9009, an aliphatic urethane acrylate oligomer ($T_g=40°$ C.); CN9010, an aliphatic urethane acrylate oligomer ($T_g=103°$ C.); CN3211, an aliphatic urethane acrylate oligomer; CN9001, an aliphatic urethane acrylate oligomer ($T_g=60°$ C.); CN2920, an aliphatic urethane acrylate oligomer ($T_g=59°$ C.); CN9011, an aliphatic urethane oligomer; CN929, a trifunctional aliphatic polyester urethane acrylate oligomer ($T_g=17°$ C.); CN962, an aliphatic polyester based urethane diacrylate oligomer ($T_g=-38°$ C.); CN965, an aliphatic polyester based urethane diacrylate oligomer ($T_g=-37°$ C.); CN991, an aliphatic polyester based urethane diacrylate oligomer; CN980, a urethane acrylate oligomer ($T_g=-29°$ C.); CN-981, an aliphatic polyester/polyether based urethane diacrylate oligomer ($T_g=22°$ C.); CN964, an aliphatic polyester based urethane diacrylate oligomer ($T_g=-24°$ C.); CN968, an aliphatic polyester based urethane hexaacrylate oligomer ($T_g=34°$ C.); CN983, an aliphatic polyester based urethane diacrylate oligomer; CN984, an aliphatic polyester based urethane diacrylate oligomer; CN9008, a trifunctional aliphatic polyester urethane acrylate oligomer ($T_g=111°$ C.); CN9024, an aliphatic urethane acrylate; CN9013, a multifunctional urethane acrylate oligomer ($T_g=143°$ C.); CN9014, an aliphatic urethane acrylate oligomer ($T_g=-41°$ C.), all available from Sartomer Company, Inc., Exton, Pa.; and LAROMER® UA 19T, UA 9028V, UA 9030V, LR 8987, UA 9029V, UA 9033V, all available from BASF.

The urethane acrylates, which primarily provide for the carbon nanotube containing layer integrity, and are UV curable, are present in an amount of, for example, from about 5 to about 80 weight percent, or from about 10 to about 40 weight percent of the UV cured carbon nanotube layer components.

Examples of the photoinitiators selected for the carbon nanotube hybrid layer include but are not limited to acyl phosphines, α-hydroxyketones, benzyl ketals, α-aminoketones, and mixtures thereof; and which photoinitiators are selected in various suitable amounts, such as illustrated herein, and, for example, from about 0.1 to about 20 weight percent, from about 1 to about 10 weight percent, from about 3 to about 7 weight percent, and from 1 to about 5 weight percent of the UV cured carbon nanotube layer components.

Examples of the acyl phosphine photoinitiators include mono acyl phosphine oxide (MAPO) such as DAROCUR® TPO; and bis acyl phosphine oxide (BAPO) such as IRGACURE® 819, both available from Ciba Specialty Chemicals. Specific examples of the acyl phosphine photoinitiators are diphenyl (2,4,6-trimethylbenzoyl)phosphine oxide (DAROCUR® TPO), diphenyl (2,4,6-trimethylbenzoyl) phosphine oxide (ESACURE® TPO, LAMBERTI Chemical Specialties, Gallarate, Italy), diphenyl (2,4,6-trimethylbenzoyl)phosphine oxide (FIRSTCURE® HMPP available from Albemarle Corporation, Baton Rouge, La.), diphenyl (2,4,6-trimethylbenzoyl)phosphine oxide (LUCIRIN® TPO, available from BASF, Ludwigshafen, Germany), diphenyl (2,4,6-trimethylbenzoyl)phosphinate (LUCIRIN® TPO-L), and phenyl bis(2,4,6-trimethyl benzoyl)phosphine oxide (IRGACURE® 819, available from Ciba Specialty Chemicals).

Examples of the α-hydroxyketone photoinitiators selected for the carbon nanotube hybrid layer mixture include 1-hydroxy-cyclohexylphenyl ketone (IRGACURE® 184), 2-hydroxy-2-methyl-1-phenyl-1-propanone (DAROCUR® 1173), and 2-hydroxy-1-[4-(2-hydroxyethoxy)phenyl]-2-methyl-1-propanone (IRGACURE® 2959), all available from Ciba Specialty Chemicals.

Examples of the α-aminoketones photoinitiators selected for the carbon nanotube hybrid surface layer mixture include 2-benzyl-2-(dimethylamino)-1-[4-(4-morpholinyl)phenyl]-1-butanone (IRGACU RE® 369), and 2-methyl-1-[4-(methylthio)phenyl]-2-(4-morpholinyl)-1-propanone (IRGACURE® 907), both available from Ciba Specialty Chemicals.

Examples of the benzyl ketal photoinitiators selected for the carbon nanotube hybrid surface layer mixture include α,α-dimethoxy-α-phenylacetophenone (IRGACURE® 651), available from Ciba Specialty Chemicals.

The disclosed intermediate transfer members are, in embodiments, weldable, that is the seam of the member like a belt is weldable, and more specifically, may be ultrasonically welded to produce a seam. The surface resistivity of the disclosed intermediate transfer member is, for example, from about $10^8$ to about $10^{13}$ ohm/sq, or from about $10^9$ to about $10^{12}$ ohm/sq. The sheet resistivity of the intermediate transfer weldable member is, for example, from about $10^8$ to about $10^{13}$ ohm/sq, or from about $10^9$ to about $10^{12}$ ohm/sq.

The intermediate transfer members illustrated herein like intermediate transfer belts can be selected for a number of printing, and copying systems, inclusive of xerographic printing. For example, the disclosed intermediate transfer members can be incorporated into a multi-imaging system where each image being transferred is formed on the imaging or photoconductive drum at an image forming station, wherein each of these images is then developed at a developing station, and transferred to the intermediate transfer member. The images may be formed on the photoconductor and developed sequentially, and then transferred to the intermediate transfer member. In an alternative method, each image may be formed on the photoconductor or photoreceptor drum, developed, and transferred in registration to the intermediate transfer member. In an embodiment, the multi-image system is a color copying system, wherein each color of an image being copied is formed on the photoreceptor drum, developed, and transferred to the intermediate transfer member.

Subsequent to the toner latent image being transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

The intermediate transfer member present in the imaging systems illustrated herein, and other known imaging and printing systems, may be in the configuration of a sheet, a web, a belt, including an endless belt, an endless seamed flexible belt, and an endless seamed flexible belt; a roller, a film, a foil, a strip, a coil, a cylinder, a drum, an endless strip, and a circular disc. The intermediate transfer member can be comprised of a single layer, or it can be comprised of several layers, such as from about 2 to about 5 layers. In embodiments, the intermediate transfer member further includes an outer release layer.

Optional release layer examples situated on and in contact with the carbon nanotube hybrid mixture top layer, and of a suitable thickness of, for example, from about 0.5 to about 50 microns, from about 1 to about 30 microns, from about 1 to about 5 microns, and from about 0.01 to about 10 microns, include suitable materials, such as TEFLON®-like materials including fluorinated ethylene propylene copolymer (FEP), polytetrafluoroethylene (PTFE), polyfluoroalkoxy polytetrafluoroethylene (PFA TEFLON®) and other TEFLON®—like materials; silicone materials such as fluorosilicones and silicone rubbers such as Silicone Rubber 552, available from Sampson Coatings, Richmond, Va., (polydimethyl siloxane/dibutyl tin diacetate, 0.45 gram DBTDA per 100 grams polydimethyl siloxane rubber mixture with, for example, a molecular weight $M_w$ of approximately 3,500); and fluoroelastomers such as those available as VITON®, such as copolymers and terpolymers of vinylidenefluoride, hexafluoropropylene, and tetrafluoroethylene, which are known commercially under various designations as VITON A®, VITON E®, VITON E60C®, VITON E45®, VITON E430®, VITON B910®, VITON GH®, VITON B50®, VITON E45®, and VITON GF®. The VITON® designation is a Trademark of E.I. DuPont de Nemours, Inc. Two known fluoroelastomers are comprised of (1) a class of copolymers of vinylidenefluoride, and hexafluoropropylene, known commercially as VITON A®; (2) a class of terpolymers of vinylidenefluoride, hexafluoropropylene, and tetrafluoroethylene known commercially as VITON B®, and (3) a class of tetrapolymers of vinylidenefluoride, hexafluoropropylene, tetrafluoroethylene, and a cure site monomer, such as VITON GF®, having 35 mole percent of vinylidenefluoride, 34 mole percent of hexafluoropropylene, and 29 mole percent of tetrafluoroethylene with 2 percent cure site monomer. The cure site monomer can be those available from E.I. DuPont such as 4-bromoperfluorobutene-1,1,1-dihydro-4-bromoperfluorobutene-1,3-bromoperfluoropropene-1,1,1-dihydro-3-bromoperfluoropropene-1, or any other suitable known commercially available cure site monomers.

The layer or layers may be deposited on the substrate by known coating processes. Known methods for forming the carbon nanotube hybrid mixture on the substrate include dipping, spraying, such as by multiple spray applications of thin films, casting, flow coating, web coating, roll coating, extrusion, molding, or the like. In embodiments, the layer or layers can be deposited or generated by spraying such as by multiple spray applications of thin films, casting, by web coating, by flow coating, and more specifically, by lamination.

The circumference of the intermediate transfer member, especially as it is applicable to a film or a belt configuration, is, for example, from about 250 to about 2,500 millimeters, from about 1,500 to about 3,000 millimeters, or from about 2,000 to about 2,200 millimeters with a corresponding width of, for example, from about 100 to about 1,000 millimeters, from about 200 to about 500 millimeters, or from about 300 to about 400 millimeters.

Throughout the disclosure and claims, the phrase "from about to about" includes all values therebetween, thus from about 1 to about 50 includes all numbers in between 1 and 50 like 1 to 10, 10 to 20, 20 to 30, 30 to 40, and 40 to 50, and more specifically, for example, 1 to 10 includes at least 1, 2, 3, 4, 5, 6, 7, 8, 9, and 10.

Specific embodiments will now be described in detail. These examples are intended to be illustrative, and are not limited to the materials, conditions, or process parameters set forth in these embodiments. All parts are percentages by weight of total solids unless otherwise indicated.

Preparation of Hybrid

The organic-inorganic hybrid material was synthesized as follows: methacryloxypropyl trimethoxysilane (Z-6030, Dow Corning) 5.6 grams, calcium hydroxide 0.002 gram, 2,2'-bis(4-hydroxyphenyl)hexafluoropropane (Bisphenol AF), 12.4 grams, and solvent tetrahydrofuran (THF) 100 grams were magnetically stirred and heated to refluxing for 6 hours, and 90 milliliters of THF was distilled off resulting in a clear slightly yellowish liquid, and where the hybrid material resulting, which had a weight average molecular weight of about 2,000 as determined by GPC, is represented by with 26.25 grams of a polyamic acid (polyimide precursor) solution, VTEC™ PI 1388 (20 weight percent solution in N-methylpyrrolidone, $T_g$>320° C.), as obtained from Richard Blaine International, Incorporated. By ball milling this mixture with 2 millimeter stainless shot with an Attritor for 1 hour, a uniform dispersion was obtained. The resulting dispersion was then coated on a glass plate using a draw bar coating method. Subsequently, the film obtained was dried at 100° C. for 20 minutes, and then at 200° C. for an additional 60 minutes while remaining on the glass plate.

A CNT UV hybrid cured layer was prepared as follows. One hundred grams of the multi-walled nanotube (MWNT)/dispersant/methylene chloride dispersion (MWNT/dispersant of 83/17 in methylene chloride, about 0.78 weight percent solids), as obtained from Zyvex Performance Materials, were mixed with 74.9 grams of the hybrid synthesized as above with a weight average molecular weight of about 2,000, and 2.3 grams of the photoinitiator, IRGACURE® 819 (phenyl bis(2,4,6-trimethyl benzoyl)phosphine oxide, obtained from Ciba Specialty Chemicals). By ball milling this mixture with 2 millimeter stainless shot with an Attritor for 1 hour, a uniform dispersion was obtained. The resulting dispersion was then coated on the above polyimide bottom, or first layer present on the glass plate using a draw bar coating method. Subsequently, the resulting dual layer film obtained was cured using a Hanovia UV instrument for 10 seconds (325 nanometer UV, 125 watts).

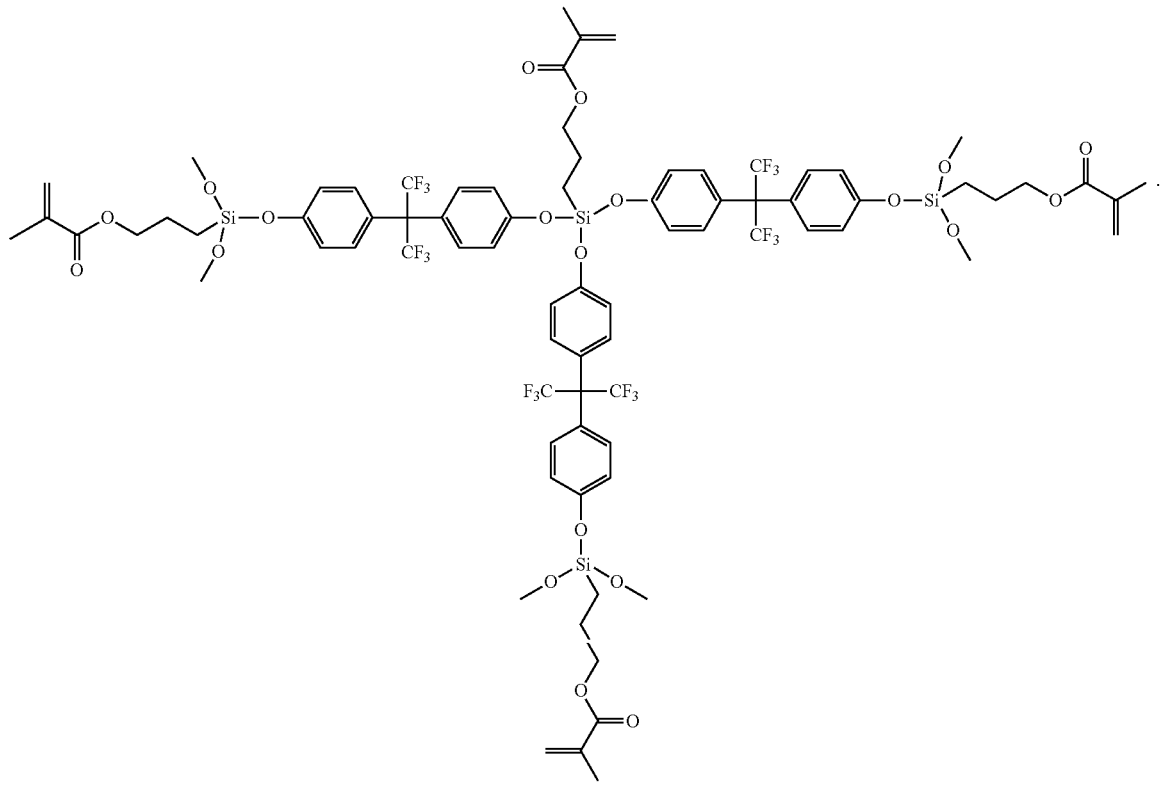 [SMILES: C=C(C)C(=O)OCCC[Si](OC)(OC)Oc1ccc(C(c2ccc(O[Si](CCCOC(=O)C(=C)C)(Oc3ccc(C(c4ccc(O[Si](CCCOC(=O)C(=C)C)(OC)OC)cc4)(C(F)(F)F)C(F)(F)F)cc3)Oc3ccc(C(c4ccc(O[Si](CCCOC(=O)C(=C)C)(OC)OC)cc4)(C(F)(F)F)C(F)(F)F)cc3)cc2)(C(F)(F)F)C(F)(F)F)cc1]

EXAMPLE I

Preparation of a Dual Carbon Nanotube Transfer Member:

A polyimide base layer was prepared as follows. One gram of Color Black FW1 (B.E.T. surface area of 320 m²/g, DBP absorption of 2.89 ml/g, primary particle diameter of 13 nanometers), as obtained from Evonik-Degussa, was mixed The above obtained dual layer film on the glass was then immersed into water overnight, about 23 hours, and the freestanding film was released from the glass automatically resulting in a dual layer intermediate transfer member with a 75 micron thick carbon black/polyimide base layer with a ratio by weight percent of 14 carbon black and 86 polyimide, and a 10 micron thick MWCNT UV cured surface layer coated on the above polyimide base layer with a ratio by weight percent of 0.83 MWNT, 0.17 dispersant, 3 IRGA-CURE® 819, and 96 hybrid.

EXAMPLE II

Preparation of a Dual Carbon Nanotube Transfer Member:

A dual layer transfer member was prepared by repeating the process of Example I except that the CNT UV cured surface layer was prepared as follows. One hundred grams of the multi-walled nanotube (MWNT)/dispersant/methylene chloride dispersion (MWNT/dispersant is 83/17 in methylene chloride, about 0.78 weight percent solids), as obtained from Zyvex Performance Materials, were mixed with 45.5 grams of the aromatic urethane triacrylate oligomer, SARTOMER® CN2901 ($T_g$=35° C., obtained from Sartomer, Exton, Pa.), 79.3 grams of the hybrid, and 4.4 grams of the photoinitiator, IRGACURE® 651 (α,α-dimethoxy-α-phenylacetophenone, available from Ciba Specialty Chemicals). By ball milling this mixture with 2 millimeter stainless shot with an Attritor for 1 hour, a uniform dispersion was obtained. The resulting dispersion was then coated on the above polyimide bottom, or first layer present on the glass plate using a draw bar coating method. Subsequently, the resulting dual layer film obtained was cured using a Hanovia UV instrument for 10 seconds (325 nanometer UV, 125 watts).

The dual layer film on the glass was then immersed into water overnight, about 23 hours, and the freestanding film was released from the glass automatically resulting in a dual layer intermediate transfer member with a 75 micron thick carbon black/polyimide base layer with a ratio by weight percent of 14 carbon black and 86 polyimide, and a 10 micron thick MWNT UV cured surface layer with a ratio by weight percent of 0.50 MWNT, 0.10 the dispersant, 61 the hybrid, 35 the urethane acrylate, and 3.4 IRGACURE® 651.

EXAMPLE III

Preparation of a Single Carbon Nanotube Transfer Member:

Single layer intermediate transfer members were prepared by repeating the above processes of Example II, except that a polyimide supporting substrate was not used. More specifically, the UV cured ITB dispersion prepared was comprised of the above synthetic organic inorganic hybrid material/ SARTOMER® CN2901/MWCNT/the dispersant/IRGA-CURE® 651=61/35/0.5/0.1/3.4, where SARTOMER® CN2901 is an aromatic urethane acrylate; MWCNT/the dispersant is the above multi-walled carbon nanotube with the dispersant; and IRGACURE® 651 is α,α-dimethoxy-α-phenylacetophenone, a photoinitiator. The dispersion obtained was coated on a glass plate, and then UV cured for 40 seconds (HANOVIA, 125 watts). The ITB device was released from the glass plate, and a flat freestanding ITB device (about 100 μm thick) was obtained.

Surface Resistivity Measurement

The above ITB members or devices of Examples I, II and III were measured for surface resistivity (averaging four to six measurements at varying spots, 72° F./65 percent room humidity) using a High Resistivity Meter (Hiresta-Up MCP-HT450 from Mitsubishi Chemical Corp.). The results are provided in Table 1.

TABLE 1

| | Surface Resistivity (Ohm/sq) |
|---|---|
| Example I | $2.5 \times 10^7$ |
| Example II | $3.5 \times 10^9$ |
| Example III | $3.5 \times 10^9$ |

The surface resistivity of Examples II and III was about $3.5 \times 10^9$ ohm/square, within the functional range of an ITB of from about $10^9$ to about $10^{13}$ ohm/square.

Young's Modulus Measurement

The above ITB member or device of Example III was measured for Young's modulus following the ASTM D882-97 process. An Example I belt sample (0.5 inch×12 inch) was placed in the measurement apparatus, the Instron Tensile Tester, and then elongated at a constant pull rate until breaking. During this time, the instrument recorded the resulting load versus sample elongation. The modulus was calculated by taking any point tangential to the initial linear portion of this curve and dividing the tensile stress by the corresponding strain. The tensile stress was calculated by dividing the load by the average cross sectional area of the test sample or specimen.

The Young's modulus of the Example III ITB device was measured to be about 2,100 MPa (Mega Pascal) within the reported modulus range of a number of known thermoplastic ITBs (from about 1,000 to about 3,500 MPa). Examples of these thermoplastic ITBs are polyester/carbon black ITB (Young's modulus of about 1,200 MPa), polyimide/carbon black ITB (Young's modulus of about 1,100 MPa), and polyimide/polyaniline ITB (Young's modulus of about 3,500 MPa).

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member consisting of a supporting substrate first layer which has incorporated therein a conductive component of carbon black, or a polyaniline and a second surface layer consisting of a mixture of a carbon nanotube present in an amount of from about 0.5 to about 10 weight percent, a photoinitiator selected from the group consisting of diphenyl (2,4,6-trimethylbenzoyl) phosphine oxide, diphenyl (2,4,6-trimethylbenzoyl) phosphinate, phenyl bis(2,4,6-trimethyl benzoyl) phosphine oxide, 1-hydroxy-cyclohexylphenyl ketone, 2-hydroxy-2-methyl-1-phenyl-1-propanone, 2-hydroxy-1-[4-(2-hydroxyethoxy) phenyl]-2-methyl-1-propanone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, and α,α-dimethoxy-α-phenylacetophenone, each present in an amount of from about 1 to about 7 weight percent, and a hybrid component formed by the reaction of 2,2-bis(4-hydroxyphenyl)hexafluoropropane and 3-acryloyloxypropyl trimethoxysilane, or 4,4'-dihydroxybiphenyl and 3-acryloyloxypropyl trimethoxysilane and wherein said supporting substrate first layer is of a thickness of from about 20 to about 500 microns, and second surface layer is of a thickness of from about 1 to about 150 microns and said hybrid component is present in an amount of from about 10 to about 90 weight percent and wherein said carbon nanotube is treated with a dispersant as represented by at least one of

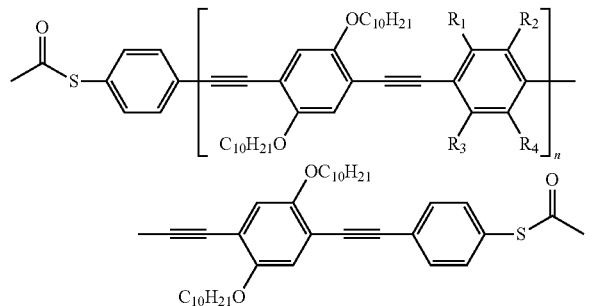

wherein when $R_1$ and $R_4$ are hydrogen, $R_2$ and $R_3$ are $OC_{10}H_{21}$; wherein $R_1$, $R_2$, $R_3$ and $R_4$ are a halide, alkyl or aryl; or wherein when $R_1$ and $R_4$ are hydrogen, $R_2$ and $R_3$ are

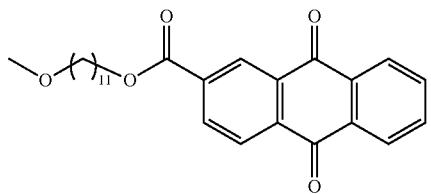

wherein n represents the number of repeating segments and is a number of from about 10 to about 150, or

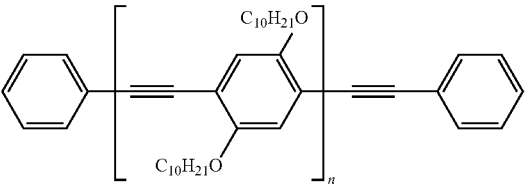

wherein n represents the number of repeating segments and is a number of from about 10 to about 150.

2. The intermediate transfer member in accordance with claim 1 wherein said hybrid is formed by the reaction of 2,2-bis(4-hydroxyphenyl)hexafluoropropane and 3-acryloyloxypropyl trimethoxysilane.

3. The intermediate transfer member in accordance with claim 1 wherein the supporting substrate first layer is a polyimide.

4. The intermediate transfer member in accordance with claim 1 wherein said halide is fluoride.

5. The intermediate transfer member in accordance with claim 1 wherein $R_1$, $R_2$, $R_3$, and $R_4$ are alkyl containing from 1 to about 12 carbon atoms, or aryl containing from 6 to about 18 carbon atoms, and said halide is chloride, bromide, iodide, or fluoride.

* * * * *